June 10, 1952   F. D. HANSON ET AL   2,599,760
FLEXIBLE SPRING TRANSMITTER
Filed June 30, 1948
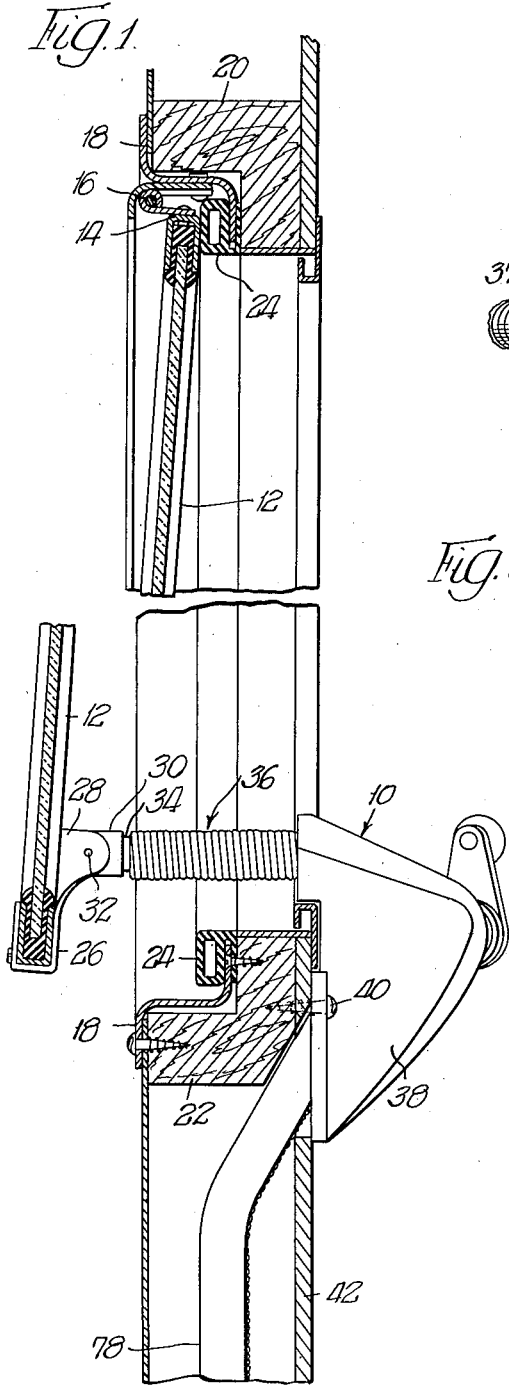
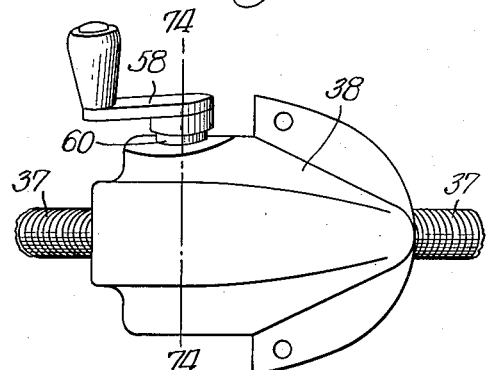
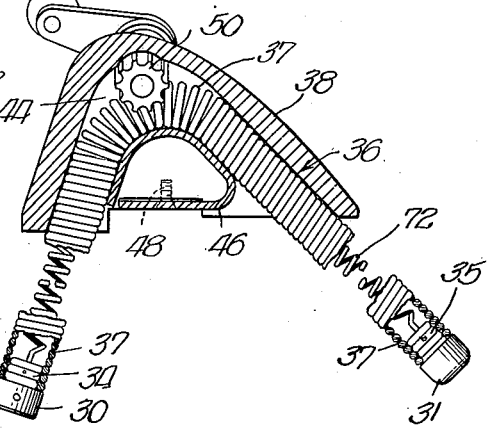
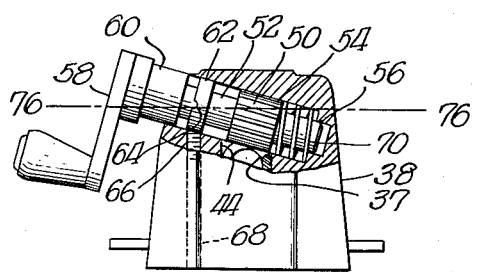
Inventors:
Frank D. Hanson,
Henry R. Parker,
BY Lyndon L. Wagener Patented June 10, 1952

2,599,760

UNITED STATES PATENT OFFICE 2,599,760

FLEXIBLE SPRING TRANSMITTER

Frank D. Hanson, Independence, Henry R. Parker, Holden, and Lyndon L. Wagener, Independence, Mo., assignors to Palace Corporation, Flint, Mich., a corporation of Michigan Application June 30, 1948, Serial No. 36,185

1 Claim. (Cl. 74—501)

This invention relates to a new and improved control device adapted to serve as a mechanical element in various mechanical combinations. More particularly, it relates to a control device comprising a flexible hollow arm member with a suitable tension means disposed therein, and means for extending and retracting said arm member as well as locking the same in any desired position of adjustment.

Control devices of the thrust transmitting type that are utilized in most mechanical combinations ordinarily employ a permanently rigid arm member. However, in many instances, it would be desirable to have such an element constructed so as to be normally rigid throughout its length but which may be given a non-linear configuration at any point throughout its length, as desired. Such a characteristic in a control device might be desirable, for example, in an opening and closing mechanism for windows which are pivoted along one edge rather than adapted to slide in a vertical plane. The simplest and most direct method of controlling the position of the movable portion of such pivoted windows, or any like pivoted element is by utilizing a thrust transmitting member pivotally secured thereto, which means is normally associated with a guide and locking means.

Nevertheless, when a permanently rigid member is used as the operating or thrust transmitting arm in such a pivoted window, or the like, the arrangement has several disadvantages. In any intermediate position of adjustment between the fully opened and fully closed position a portion of the operating arm will normally protrude inwardly from the window. This is often a very undesirable feature because of the character of the immediate surroundings. For example, in an automobile trailer used for residence purposes such protruding members have been found to be dangerous and impractical.

In addition, if a control device having a rigid thrust transmitting arm is used to operate a window which is pivoted along its upper edge so that it will swing toward a horizontal position when opened, a sudden release of the secured movable portion of the window when it is in a position approaching the horizontal will cause it to swing to the closed position with considerable force. This unrestrained closing may not only endanger the glass in the window but may also cause the thrust transmitting arm to become a dangerous instrumentality, since it will be thrust violently into the interior of the structure in which the window is disposed.

To overcome the first disadvantage, it would therefore be desirable to provide a control device which is capable of having the inwardly protruding portion of the thrust transmitting member disposed out of the way when the window or the like is in various positions of adjustment. To overcome the second disadvantage it would be desirable to incorporate in the control device some means of automatically retarding the downward swing of the movable portion of the window when it is released from a position approaching the horizontal, which means should preferably form a part of an extension, retraction, and lock mechanism for the thrust transmitting arm.

It is therefore an object of this invention to provide a new and improved control device which is adapted to serve as a mechanical element in various mechanical combinations.

Another object is to provide a control device having a thrust transmitting arm which is normally substantially rigid throughout its entire length but which may be given a non-linear configuration at any point as desired.

A further object is to provide such a control device having an operating arm which when caused to be distorted between the object being controlled, such as a window, and the lock mechanism by some unusual force, will automatically restore itself and said object to the normal position.

It is a further object of this invention to provide a control device having a normally rigid thrust transmitting arm which may be secured at any point intermediate its ends and which is so constructed that the unused portion for any position of adjustment can be directed into an unprotruding position.

Another object of this invention is to provide a control device having a thrust transmitting arm which may be moved longitudinally by operation of a crank member or the like, but which will automatically lock in position when the crank member is released.

Still another object is to provide a control device of the character described which is simple to operate and which is reliable and positive in its action notwithstanding the fact that the thrust transmitting arm may be given considerable flexibility when desired.

Further objects and advantages of this invention will become evident as the description proceeds, and from an examination of the accompanying drawing which illustrates one embodiment of the invention and in which similar numerals refer to similar parts throughout the several views.

In the drawing:

Fig. 1 is a view in vertical cross section of one form of control device embodying this invention, the device being shown associated with a pivoted window of the type normally found in automobile trailers designed for residence purposes.

Fig. 2 is a plan view of the control device alone, shown in Fig. 1, the thrust transmitting arm being shown only in part.

Fig. 3 is a view in vertical cross section of the control device shown in Fig. 2, the section being taken substantially along the longitudinal axis of the thrust transmitting arm.

Fig. 4 is an end view partly broken away of the control device shown in Fig. 2, showing the angular disposition of the operating mechanism.

Referring now to Fig. 1, a control device embodying this invention and designated generally by the numeral 10 is shown disposed in operative relation with a window 12, the latter being adapted to pivot along its upper edge. The window installation shown is of the type commonly used in automobile trailers adapted for use as residences. The upper edge 14 of the window 12 is secured to one arm of the hinge member 16, the other arm of the latter being secured to the recessed window frame 18. The window frame 18 is, in turn, secured to the wooden frame members 20 and 22. The window 12 is adapted to bear against the rubber gasket 24, circumscribing the window, when the window is in a fully closed position. The bottom edge 26 of the window has the yoke member 28 centrally disposed thereon, which yoke member, in turn, has the plug member 30 pivotally mounted therein on the pin 32. The plug 30 has the reduced portion 34 extending into the thrust transmitting arm 36 which is in the form of a closely wound coiled spring 37, the individual coils of which are adapted to abut each other, as best shown in Fig. 3.

The thrust transmitting arm 36 extends into association with the substantially triangularly shaped housing 38 of the control device. This housing is mounted on the inner edge of the bottom of the window assembly and is secured by suitable holding members such as the screws 40 to the inner panel 42 and the wooden frame 22. As is shown in Figures 1, 2 and 3, the housing 38 is adapted to have the thrust transmitting arm 36 inserted in the passage formed by the groove 44, formed in the housing 38, and the guide member 46 secured to the lateral edges of the base of the housing 38 by suitable holding members such as the bolt 48. The face of the guide member 46 which is adjacent the groove 44 has a slight concave configuration when viewed in lateral cross section, as does the base of the groove 44 at the points where the thrust transmitting arm 36 is adapted to bear against it.

As best shown in Figures 2, 3 and 4, the angular portion of the groove 44 has mounted therein a gear wheel 50 which gear is, in turn, mounted on a shaft 52 journaled in the lateral bore 54 formed at the apex of the triangular housing 38. One end of the shaft 52 is journaled on the reduced portion 56 of the bore 54 while the other end of the shaft 52 projects outwardly from the bore 54, and has an operating member such as the crank member 58 together with its associated collar 60, secured thereto. In addition, the shaft 52 has a second collar 62 rigidly secured thereto between the collar 60 and the gear wheel 50.

The second collar 62 has a plurality of notches 64 formed in the face thereof which is adjacent the collar 60, which notches are adapted to receive the stop member 66 which may be in the form of a dog point set screw. This set screw may be threaded into the threaded opening 68 in the housing 38 so that it projects into the bore 54, with which the opening 68 communicates. The shaft 52 is normally maintained in a position which will cause one of the notches 64 to receive the set screw 66 by the spring member 70, which is adapted to bear against the base of the bore 54 and the side of the gear wheel adjacent thereto, as best shown in Fig. 4.

As mentioned above, the thrust transmitting arm 36 is shown in the form of a closely wound coiled spring 37, the individual coils of which are adapted to normally abut each other. The plug members 30 and 31 have the reduced portions 34 and 35 respectively and are disposed with these reduced portions extending into the two ends of the coiled spring 37. These reduced portions 34 and 35, in turn, have secured thereto the two ends of the tension spring 72, which is disposed under tension within the coiled spring 37 to form the complete thrust transmitting arm 36. The tension spring 72 is adapted to normally exert a constricting force on the two ends of the spring 37 substantially along the longitudinal axis thereof, which constricting force gives the spring 37 an unusual amount of rigidity, but which does not prevent it from being flexed as desired, as best shown in Fig. 3.

As best shown in Fig. 3, the individual turns making up that portion of the spring 37 which is bent around the guide member 46 are normally separated slightly, along the side of the spring opposite to the surface of the guide member 46. The gear wheel 50 is so disposed that the grooves formed therein are adapted to receive the individual turns of the spring 37 as it passes around the guide member 46. This disposition of the gear wheel 50 is accomplished by forming the bore 54 at a slight angle with relation to a vertical plane perpendicular to the surface of the drawing, and including the broken line 74—74 in Fig. 2. As shown in Fig. 4, the bore 54 is also given an additional angularity with relation to the horizontal plane perpendicular to the surface of the drawing, and including the broken line 76—76 as shown in Fig. 4. The resultant angular disposition of the gear wheel 50 is given to that element in order to have it mesh satisfactorily with the individual turns of the spring 37. This angularity of the gear wheel 50 is necessary since the turns in any spring, no matter how closely wound, naturally have at least a slight pitch. By tilting the gear wheel 50 slightly in the proper direction it is possible to utilize a conventional form of gear having grooves which are parallel to the axis of rotation of the gear. Otherwise it would be necessary to form the gear wheel 50 with teeth having a slight angularity with respect to axis of rotation of the drum in order to achieve a proper meshing between the grooves in the gear and the individual turns in the spring 36.

The second angular disposition mentioned above which is given to the shaft 52 and the bore 54 is merely to provide additional clearance for the hand of the operator as the crank member 58 is rotated. In any event, the gear wheel 50 is so disposed that the individual turns of the spring 37 are adapted to be received in the grooves thereof, as the gear wheel is rotated by operation of the crank member 58. In other words, the individual turns of the spring 37, when slightly separated as they pass around the angular portion of the guide member 46, act substantially as the teeth in a gear, and mesh with the grooves in the gear wheel 50. By rotation of the gear wheel 50 longitudinal movement may therefore be imparted to the thrust transmitting arm 36.

In view of the construction of the notched collar 62, which is adapted to cooperate with the set screw 66, it is necessary to first move the shaft 52 along its longitudinal axis toward the reduced portion 56 of the bore 54 before the crank member 58 may be rotated, as was mentioned above. When the shaft 52 is maintained in this position, in opposition to the force exerted by the spring member 70, the crank member 58 may be freely turned. However, as soon as this longitudinally applied force is released from the shaft 52, and the crank member 58, the spring member 70 will urge the shaft 52 in a direction away from the reduced portion 56 of the bore 54 and will therefore cause the collar 62 to bear against the set screw 66, and if none of the notches 76 are exactly aligned with the set screw 66, only a relatively small movement of the crank member 58 will cause one of these notches to be brought into alignment so that the set screw 66 will be received therein. The shaft 52 will then be locked against rotation and will remain so until it is again moved along its longitudinal axis in the direction of the reduced portion 56 of the bore 54. Because this application of force in the direction of the reduced portion 56 of the bore 54 is necessary to the free rotation of the collar 62, and therefore the shaft 52, it is normally impossible to cause the thrust transmitting arm to move longitudinally by exerting a longitudinal force thereon. This feature permits the control device to be used to lock the thrust transmitting arm 36 and therefore the object controlled thereby, such as the window 12 shown in Fig. 1, substantially in any position of adjustment desired. For example, the window 12 shown in Fig. 1 has been locked in a slightly open position, and it could be similarly locked in a position approaching the horizontal, or in a fully closed position.

The end of the thrust transmitting arm 37 which is not secured to the object which is being controlled may be allowed to protrude from the base of the housing 38 in an unobstructed fashion, if the installation lends itself to such an arrangement. However, as shown in Fig. 1, a retaining channel 78 may be provided within the wall of the structure having the window formed therein and such a channel may serve to guide the free end of the thrust transmitting arm in any desired fashion. As shown here the channel 78 is associated with the lower end of the housing 38 and adapted to initially direct the free end of the arm in a direction which is substantially the same as that in which the arm first emerges from the housing 38. Subsequently the arm is directed downwardly in a substantially vertical direction. Such an arrangement permits the clearance of any obstructions which might otherwise be subjected to wear, or which might interfere with the smooth operation of the device. In addition, the plug member 31 may be given a rounded form as shown in Fig. 3 so that it will be well adapted to pass over and around any obstructions.

Since the free end of the thrust transmitting arm emerges from the side of the housing 38 which is adjacent to the wall panel 42 this portion of the thrust transmitting arm is completely concealed and the control device therefore presents a very neat and attractive appearance, and at the same time eliminates the undesirable projection of the portion of the thrust transmitting arm 36. The only exposed portions of the device as far as the inner side of the window is concerned are the housing 38 and the crank member 58.

In addition to the characteristic of the locking mechanism described above which allows the window to be disposed at any desired point at or between the fully closed and fully opened position, this same locking mechanism insures that the window will never be allowed to close in one rapid downward movement since in order for it to have its position altered the crank member 58 must first be depressed toward the housing and then revolved. If for any reason the crank member is suddenly released during this operation the spring 70 will operate to immediately move the shaft 52 and the gear 50 longitudinally and one of the notches 64 formed in the collar 62 will move into association with the stop member 66, and the movement of the thrust transmitting arm 36 will be abruptly and immediately terminated.

The construction shown for the thrust transmitting arm 36 is particularly advantageous. It is desirable to have a thrust transmitting arm which is rigid enough to keep from bending or collapsing when it is subjected to a fairly large force, substantially in the direction of the longitudinal axis of the arm. At the same time it is desirable to have an arm of sufficient flexibility so that it may be given an angular disposition as it passes over the guide member 46.

This seemingly paradoxical problem of providing a thrust transmitting arm which is both rigid and flexible is overcome by the use of a closely wound coiled spring 37 and the internal tension spring 72 to form the thrust transmitting arm 36. The individual coils of the spring 37 are adapted to abut each other, as mentioned above, and the spring 72 disposed therein under tension is adapted to constrict the spring 37 along its longitudinal axis so as to insure the abutment of the adjacent coils of the spring 37. This, in turn, increases the rigidity of the thrust transmitting arm 36. In addition, if the spring 37 is caused to bend, the tension spring 72 is stretched. The latter therefore resists such bending and tends to restore the spring 37 to its normal linear configuration so that the thrust transmitting arm 36 is also less likely to bend or buckle under the application of a longitudinal force. Moreover, if the arm is momentarily caused to buckle by the application of a sudden abnormally large force or one in a direction other than longitudinal, such as might be produced by a gust of wind affecting a window, or the like, the arm will automatically be restored to its linear form when the force is removed by the tension of the spring 72.

In the drawing and specification, there has been set forth a preferred embodiment of the invention, and although specific terms are employed, they are used in a generic and descriptive sense only and not for purposes of limitation, the scope of the invention being defined in the claim.

What is claimed is:

A control device comprising a unitary longitudinally, extensible, laterally flexible thrust transmitting arm member in the form of a closely wound, low pitch coiled spring; resilient, longitudinally, extensible tension means disposed in said arm member in the form of a second coiled spring of smaller diameter than said first named coiled spring; and means for coupling each end of said tension means to one of the ends of said arm member so that said tension means normally exerts a constricting force on said flexible member substantially along the longitudinal axis thereof so that the adjacent turns of said first named coiled spring are normally held in abutting relation.

FRANK D. HANSON.
HENRY R. PARKER.
LYNDON L. WAGENER.

REFERENCES CITED

The following references are of record in the file of this patent:

UNITED STATES PATENTS

| Number | Name | Date |
|---|---|---|
| Re. 13,884 | Herzmark | Feb. 23, 1915 |
| 1,739,756 | Granville | Dec. 17, 1929 |
| 1,983,962 | Barber et al. | Dec. 11, 1934 |

FOREIGN PATENTS

| Number | Country | Date |
|---|---|---|
| 58,121 | Denmark | June 28, 1937 |
| 663,579 | Germany | Aug. 9, 1938 |